United States Patent
Liu et al.

(10) Patent No.: US 8,081,287 B2
(45) Date of Patent: *Dec. 20, 2011

(54) LIQUID CRYSTAL DISPLAY WITH CARBON NANOTUBE HEATING ELEMENT

(75) Inventors: Liang Liu, Beijing (CN); Kai-Li Jiang, Beijing (CN); Wei-Qi Fu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 393 days.

This patent is subject to a terminal disclaimer.

(21) Appl. No.: 12/386,408

(22) Filed: Apr. 16, 2009

(65) Prior Publication Data

US 2009/0268149 A1    Oct. 29, 2009

(30) Foreign Application Priority Data

Apr. 25, 2008   (CN) .......................... 2008 1 0066690

(51) Int. Cl.
G02F 1/1333 (2006.01)
G02F 1/1345 (2006.01)
G02F 1/1337 (2006.01)

(52) U.S. Cl. ........ 349/161; 349/149; 349/158; 349/123; 977/742

(58) Field of Classification Search .................. 349/161, 349/149, 158, 123; 977/742
See application file for complete search history.

(56) References Cited

U.S. PATENT DOCUMENTS

| 7,045,108 B2 | 5/2006 | Jiang et al. |
| 2004/0053780 A1 | 3/2004 | Jiang et al. |
| 2005/0007648 A1 | 1/2005 | Wu et al. |
| 2006/0113510 A1 | 6/2006 | Luo et al. |
| 2007/0115413 A1* | 5/2007 | Liu et al. .................. 349/123 |
| 2007/0296897 A1 | 12/2007 | Liu et al. |
| 2009/0102810 A1* | 4/2009 | Jiang et al. .................. 345/173 |
| 2011/0025645 A1* | 2/2011 | Mata et al. .................. 345/174 |
| 2011/0149373 A1* | 6/2011 | Liu et al. .................. 359/288 |

FOREIGN PATENT DOCUMENTS

| CN | 1483667 A | 3/2004 |
| CN | 1955819 A | 5/2007 |
| CN | 1979948 | 6/2007 |
| JP | 2002-250909 | 9/2002 |
| JP | 2004-107196 | 4/2004 |
| JP | 2004-348121 | 12/2004 |
| JP | 2006-201575 | 8/2006 |
| JP | 2007-122057 | 5/2007 |
| JP | 2007-314776 | 12/2007 |
| JP | 2008-3606 | 1/2008 |

OTHER PUBLICATIONS

Atomic-beam alignment of inorganic materials for liquid-crystal displays? P. Chaudhari, et al., Nature, vol. 411, p. 56 (2001).
Fan et al., Explorations on growth mechanism, controlled synthesis and applications of carbon nanotubes, Physics, vol. 35, No. 5, pp. 376-381, (2006).

* cited by examiner

*Primary Examiner* — Mike Qi
(74) *Attorney, Agent, or Firm* — Altis Law Group, Inc.

(57) ABSTRACT

A liquid crystal display with at least one heating element located on at least one of a first substrate and a second substrate comprising at least one carbon nanotube structure.

20 Claims, 10 Drawing Sheets

LIQUID CRYSTAL DISPLAY WITH CARBON NANOTUBE HEATING ELEMENT

RELATED APPLICATIONS

This application is related to applications entitled "LIQUID CRYSTAL DISPLAY", Apr. 16, 2009 Ser. No. 12/386,407; "LIQUID CRYSTAL DISPLAY", filed Apr. 16,2009 Ser. No. 12/386,406. The disclosures of the above-identified applications are incorporated herein by reference. The application is also related to co-pending applications entitled "LIQUID CRYSTAL DISPLAY SCREEN", filed Nov. 20, 2008 Ser. No. 12/313,452; "LIQUID CRYSTAL DISPLAY SCREEN", filed Nov. 20, 2008 Ser. No. 12/313,394; "METHOD FOR MAKING LIQUID CRYSTAL DISPLAY SCREEN", filed Nov. 20, 2008 Ser. No. 12/313,450; "LIQUID CRYSTAL DISPLAY SCREEN", filed Nov. 20, 2008 Ser. No. 12/313,450 "LIQUID CRYSTAL DISPLAY SCREEN", filed Nov. 20, 2008 Ser. No. 12/313,393; and "LIQUID CRYSTAL DISPLAY SCREEN", filed Nov. 20, 2008 Ser. No. 12/313,415; Ser. No. 12/313,440; "METHOD FOR MAKING LIQUID CRYSTAL DISPLAY SCREEN", filed Nov. 20, 2008 Ser. No. 11/313,414.

BACKGROUND

1. Technical Field

The present disclosure relates to liquid crystal displays and, particularly, to a carbon-nanotube-based liquid crystal display.

2. Discussion of Related Art

A liquid crystal display (LCD) generally includes a first substrate, a second substrate, and a liquid crystal layer. The first substrate is located parallel to the second substrate. The liquid crystal layer including a plurality of liquid crystal molecules is located between the first substrate and the second substrate. A first transparent electrode layer and a first alignment layer are formed on a surface of the first substrate facing toward the liquid crystal layer. A first polarizer is formed on an opposite surface of the first substrate that faces away from the liquid crystal layer. A second transparent electrode layer and a second alignment layer are formed on a surface of the second substrate that faces toward the liquid crystal layer. A second polarizer is formed on an opposite surface of the second substrate that faces away from the liquid crystal layer.

When no voltage is supplied to the liquid crystal display, light can pass through the liquid crystal display. When voltage is supplied, light cannot pass through the liquid crystal display. Thus, when a predetermined voltage is selectively applied to different pixels defined in the liquid crystal display, a picture can be shown.

However, for many reasons, the liquid crystal display cannot perform in low temperature environments. Firstly, since the threshold voltage of the liquid crystal display is related to the temperature, the threshold voltage of the liquid crystal display will increase as the external temperature decreases. A change in the threshold voltage will deteriorate the contrast of the liquid crystal display. Secondly, the viscosity quid crystal molecules in the liquid crystal layer will increase as the external temperature decreases. It then becomes difficult for the liquid crystal molecules to transmit phases and so the response of the liquid crystal display becomes slow.

Conventionally, in order to overcome the above problems, a heating layer can be provided on the substrate for increasing operating temperature of the liquid crystal display. The heating layer is usually made of indium-tin oxide. However, the heating layer made of indium-tin oxide is not very efficient.

What is needed, therefore, is to provide a liquid crystal display that can perform in low temperature environments.

BRIEF DESCRIPTION OF THE DRAWINGS

Many aspects of the present liquid crystal display can be better understood with reference to the following drawings. The components in the drawings are not necessarily drawn to scale, the emphasis instead being placed upon clearly illustrating the principles of the present liquid crystal display.

Figure 1:
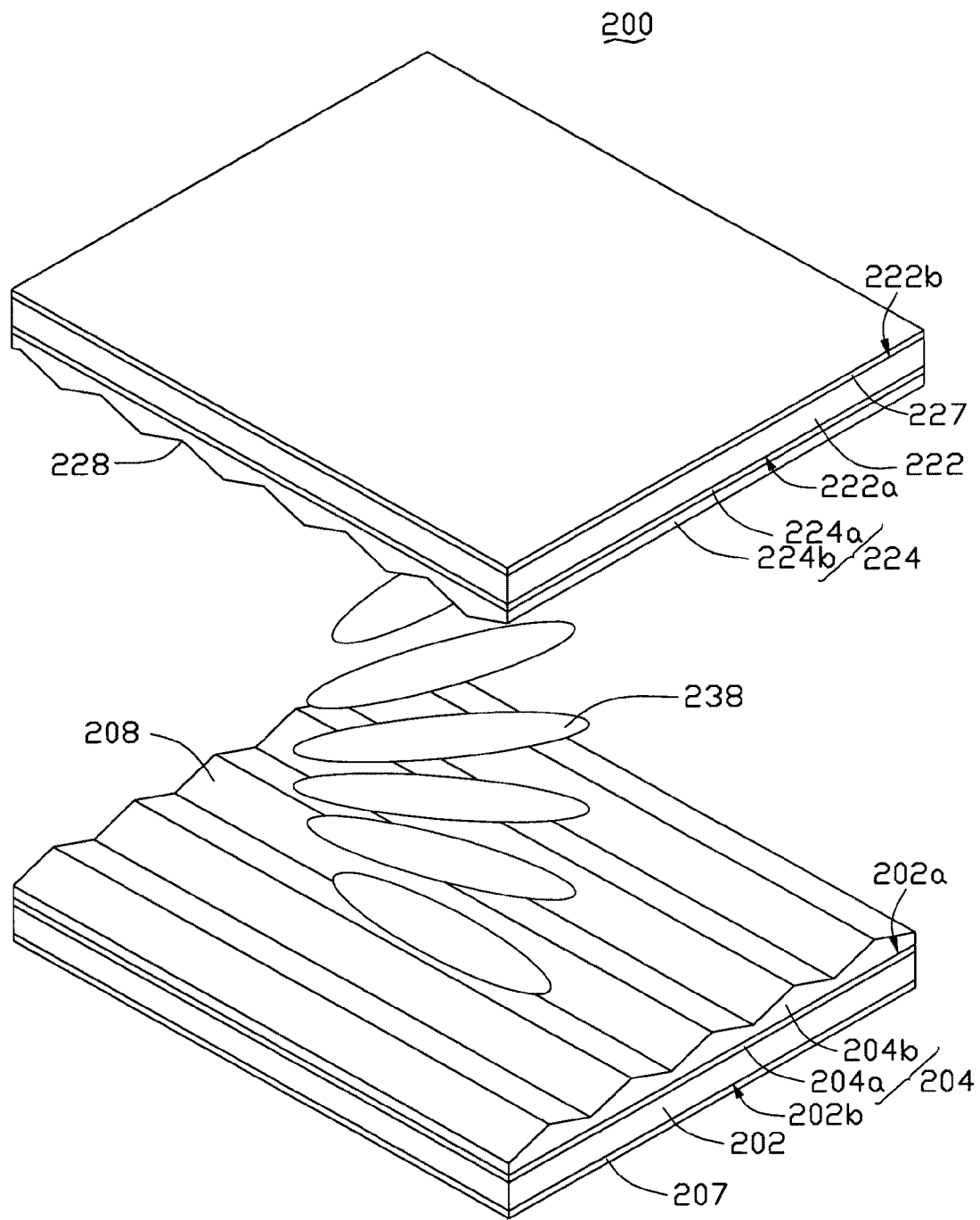
FIG. 1 is a schematic, isometric view of a liquid crystal display in accordance with a first embodiment of the present disclosure.

Corresponding reference characters indicate corresponding parts throughout the several views. The exemplifications set out herein illustrate at least one embodiment of the present liquid crystal display, in at least one form, and such exemplifications are not to be construed as limiting the scope of the disclosure in any manner.

DETAILED DESCRIPTION

References will now be made to the drawings to describe, in detail, various embodiments of the present liquid crystal display.

Referring to FIG. 1, a liquid crystal display 200 according to a first embodiment includes a first heating element 207, a first substrate 202, a first alignment layer 204, a liquid crystal layer 238, a second alignment layer 224, and a second substrate 222. The liquid crystal layer 238 is sandwiched between the first substrate 202 and the second substrate 222. The first substrate 202 has a first surface 202a and a second surface 202b opposite to the first surface 202a. The second substrate 222 has a third surface 222a and a fourth surface 222b opposite to the third surface 222a. The first alignment layer 204 is located on the first surface 202a of the first substrate 202. The first alignment layer 204 includes a plurality of parallel first grooves 208 facing the liquid crystal layer 238. The second alignment layer 224 is located on the third surface 222a of the second substrate 222. The second alignment layer 224 includes a plurality of parallel second grooves 228 facing the liquid crystal layer 238. The alignment direction of the first grooves 208 is perpendicular to the alignment direction of the second grooves 228. The first heating element 207 is located on the second surface 202b of the first substrate 202.

The first substrate 202 and the second substrate 222 can be made of materials selected from the group consisting of glass, quartz, diamond, and plastics. In the present embodiment, the first substrate 202 and the second substrate 222 are made of flexible materials, such as cellulose triacetate (CTA). According to user-specific needs, the materials of the first substrate 202 and the second substrate 222 can be the same or different.

The liquid crystal layer 238 includes a plurality of cigar-shaped liquid crystal molecules. The liquid crystal layer 238 can also be made of other liquid crystal materials, which are generally used in the present technology. Furthermore, a plurality of supporters (not shown) can be located between the first alignment layer 204 and the second alignment layer 224. The supporters can be small balls made of polyethylene. Diameter of the balls range from about 1 to about 10 micrometers. In the present embodiment, the diameters of the ball are about 5 micrometers.

The first alignment layer 204 and the second alignment layer 224 of the present embodiment are conductive and transparent. The first alignment layer 204 includes a first conductive element 204a and a first alignment element 204b. The first conductive element 204a is located between the first substrate 202 and the first alignment element 204b. The second alignment layer 224 includes a second conductive element 224a and a second alignment element 224b. The second conductive element 224a is located between the second substrate 222 and the second alignment element 224b. The conductive elements 204a, 224a are usually made of indium-tin oxide. The alignment elements 204b, 224b are made of a material typically selected from the group consisting of polystyrene, polystyrene derivative, polyimide, polyvinyl alcohol, epoxy resin, polyamine resin, and polysiloxane. In practice, a material is selected and used to form a preform of the alignment elements 204b, 224b. The grooves 208, 228 are formed by treating a surface of the preform of the alignment elements 204b, 224b with a method selected from the group consisting of rubbing, incline silicon oxide evaporation, and atomic beam alignment micro-treatment. The grooves 208, 228 are configured to arrange and orient the liquid crystal molecules of the liquid crystal layer 238 in a particular direction.

Figure 2:
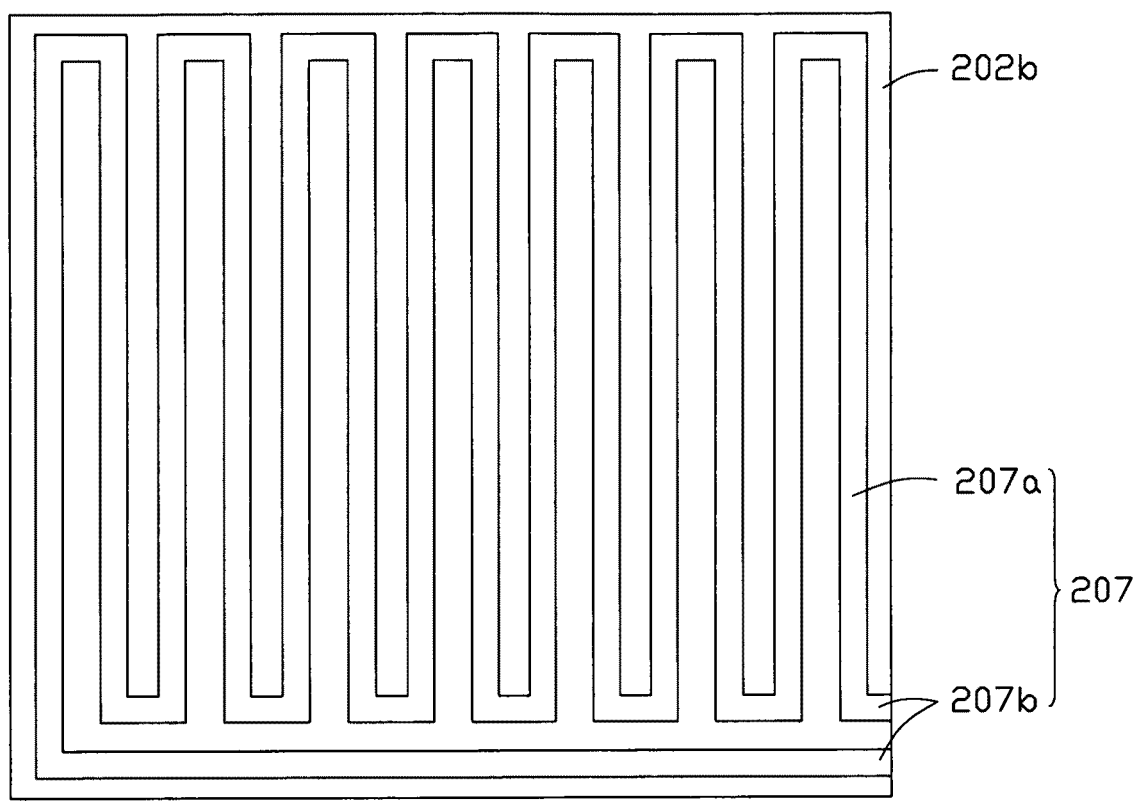
FIG. 2 is a schematic top view of the liquid crystal display of FIG. 1.

The first heating element 207 in a form of a layer can cover the entire second surface 202b of the first substrate 202. Alternatively, the first heating element 207 can be formed in a square-wave fashion or in a saw-tooth wave fashion to be located on the second surface 202b of the first substrate 202. Referring to FIG. 2, in the present embodiment, the first heating element 207 in the square-wave fashion is located on the second surface 202b of the first substrate 202. The first heating element 207 includes a heater 207a and at least two of electrodes 207b. The heater 207a can include one or more carbon nanotube structures. The carbon nanotube structures can be electrically connected in series or in parallel.

The carbon nanotube structure includes a plurality of ordered and/or disordered carbon nanotubes distributed uniformly therein. The ordered carbon nanotubes are primarily oriented along the same direction. Alternatively, the ordered carbon nanotubes can be arranged to be oriented along different directions, e.g. two different directions. The disordered carbon nanotubes are entangled with each other. The carbon nanotubes in the carbon nanotube structure can be selected from a group consisting of single-walled carbon nanotubes, double-walled carbon nanotubes, multi-walled carbon nanotubes and any combination thereof. Diameters of the single-walled carbon nanotubes range from about 0.5 to about 50 nanometers. Diameters of the double-walled carbon nanotubes range from about 1 to about 50 nanometers. Diameters of the multi-walled carbon nanotubes range from about 1.5 to about 50 nanometers. The length of each carbon nanotube can be more than 50 micrometers. Lengths of the carbon nanotubes in the present embodiment range from about 200 micrometers to about 900 micrometers. In the present embodiment, the carbon nanotube structure includes at least one carbon nanotube film, at least one carbon nanotube wire or combination thereof.

Figure 3:
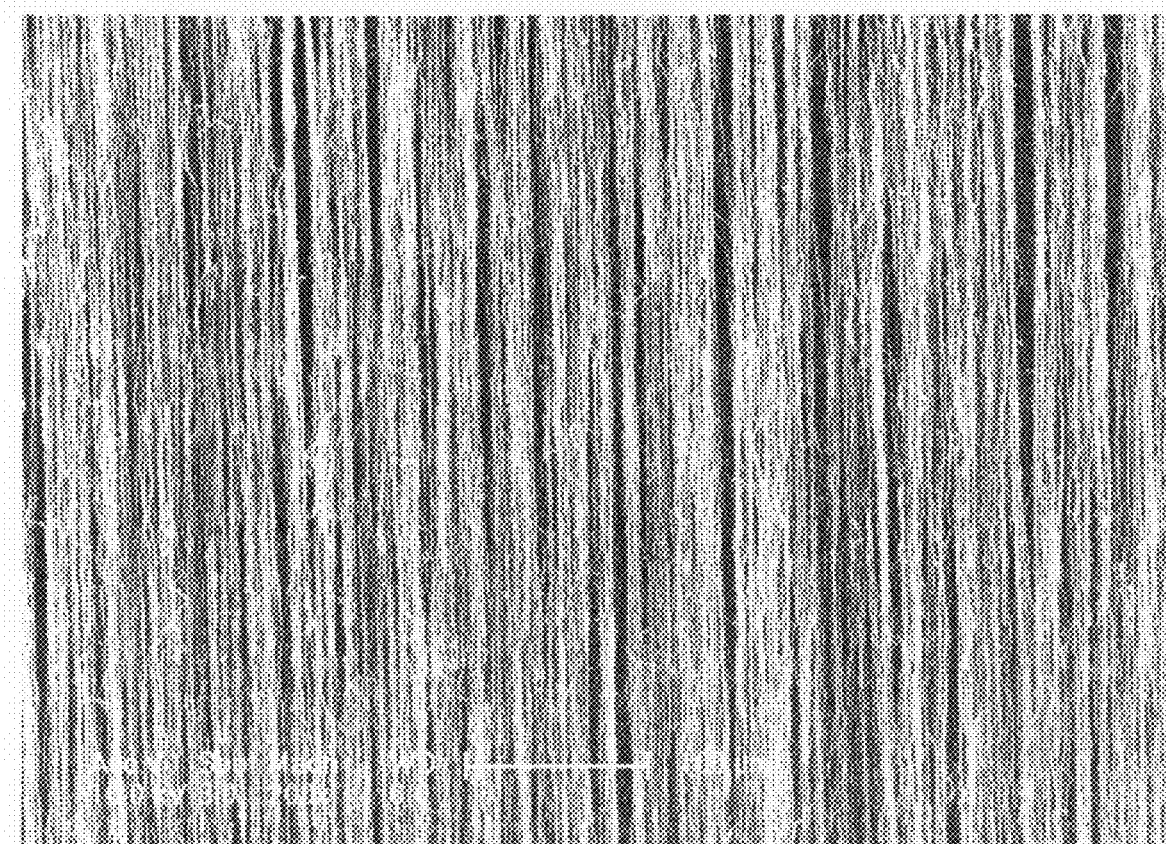
FIG. 3 is a Scanning Electron Microscope (SEM) image of a carbon nanotube film.
Figure 4:
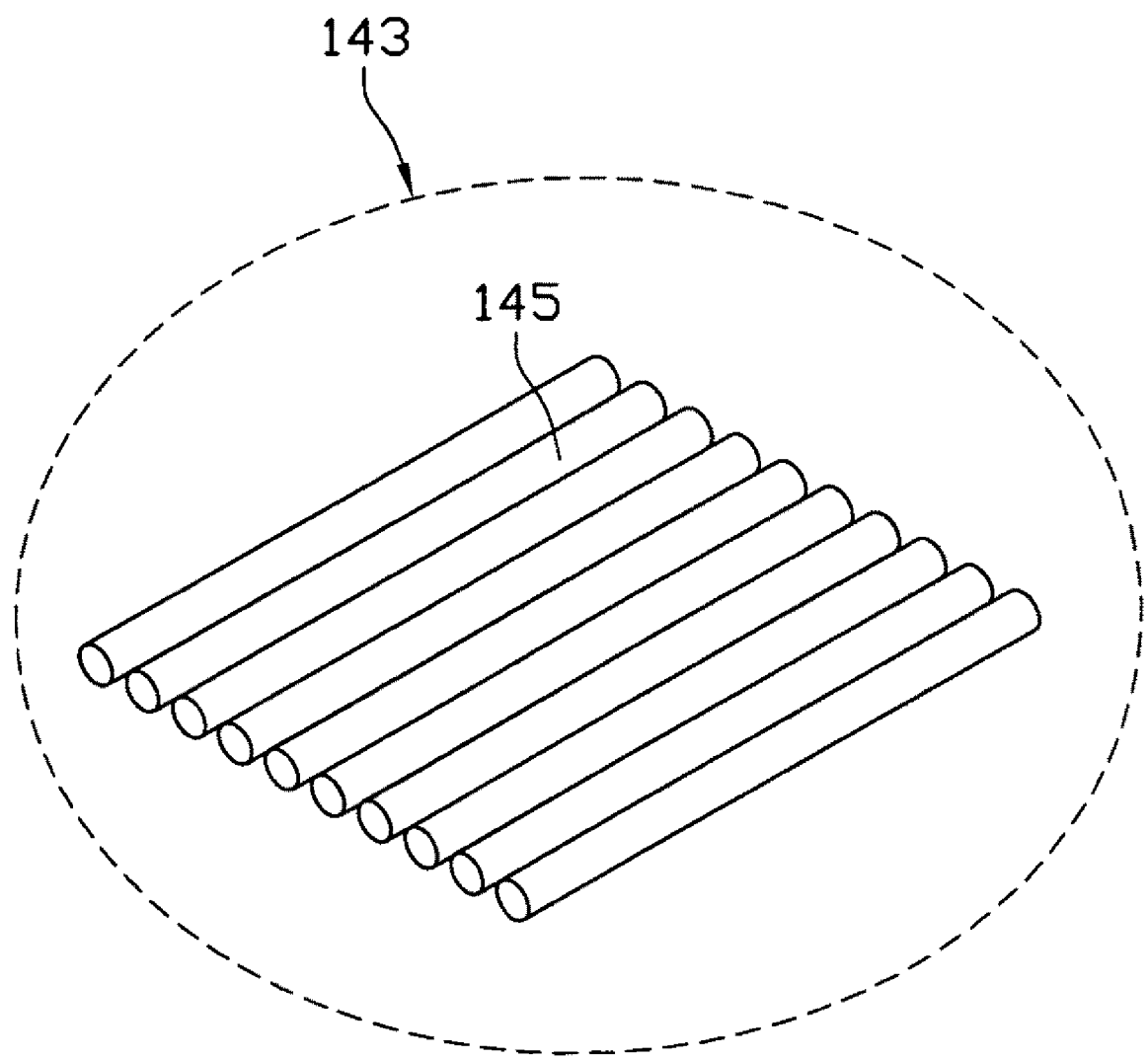
FIG. 4 is a structural schematic of a carbon nanotube segment of the carbon nanotube film of FIG. 3.

In one embodiment, the carbon nanotube structure includes one carbon nanotube film. Referring to FIG. 3 and FIG. 4, the carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotubes 145 have substantially same length. The carbon nanotube segments 143 can vary in width, thickness, uniformity and shape. The carbon nanotubes 145 in the carbon nanotube film 143 are oriented along a preferred orientation.

The carbon nanotube film can be formed by the substeps of: (a) providing a carbon nanotube array on a substrate; (b) selecting two or more carbon nanotubes having a predetermined width from the array of carbon nanotubes; and (c) pulling the carbon nanotubes to form carbon nanotube segments that are joined end to end. The carbon nanotube segments can be pulled at a uniform speed to achieve a uniform carbon nanotube film. The width and length of the carbon nanotube film is dependent on the size of the carbon nanotube array. In one embodiment, when the substrate is a 4-inch P-type silicon wafer as in the present embodiment, the width of the carbon nanotube film is in a range from about 0.5 nanometers to about 10 centimeters, and the thickness of the carbon nanotube film is in a range from about 0.5 nanometers to about 100 microns. The length of the carbon nanotube film may be greater than about 10 meters.

Alternatively, the carbon nanotube structures may include at least two stacked carbon nanotube films. Adjacent carbon nanotube films are held in contact with each other by van der Waals attractive force therebetween. An angle α between the preferred orientations of the carbon nanotubes in two adjacent carbon nanotube films is in the range of 0 up to and including 90 degrees.

Figure 5:
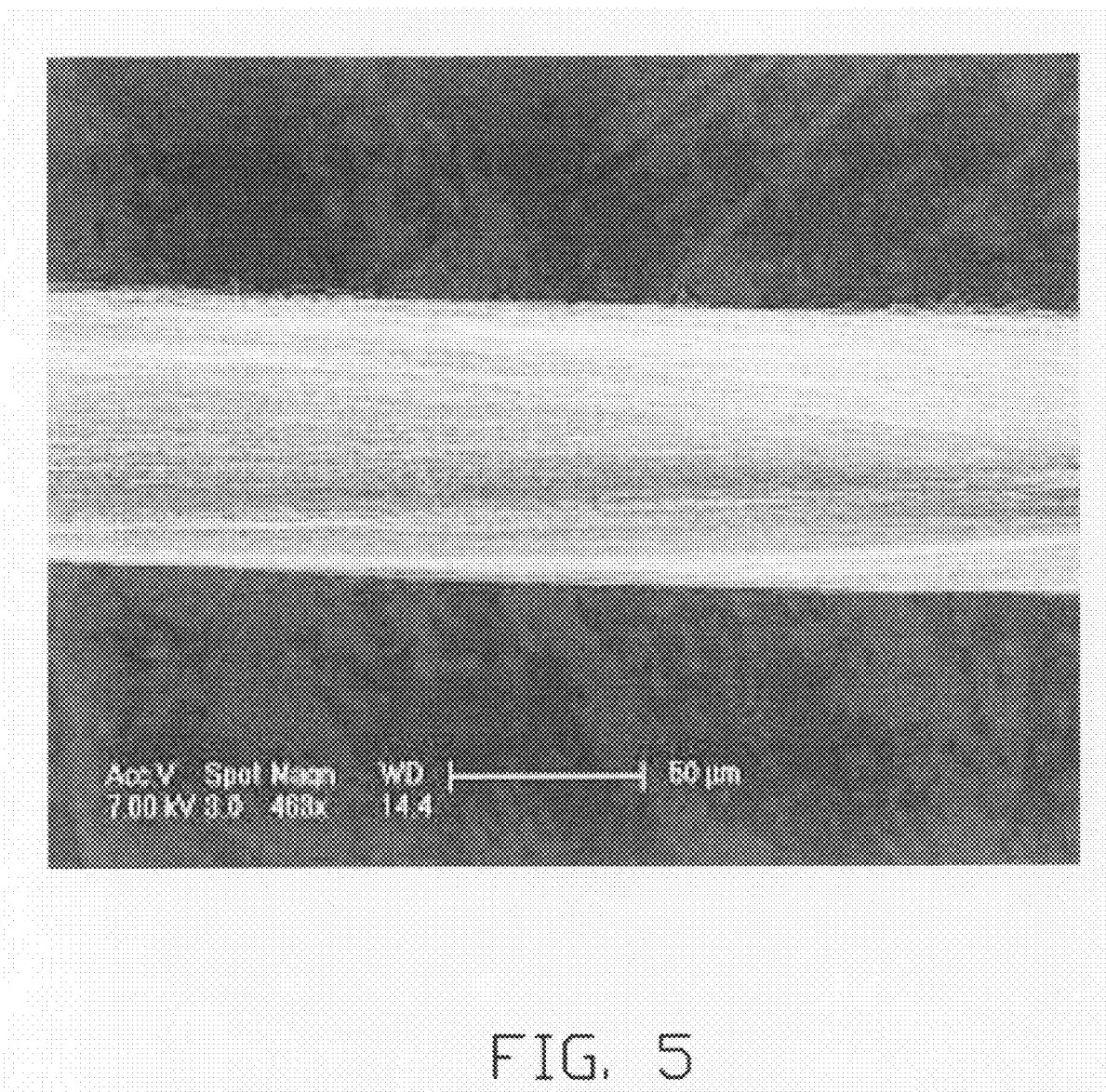
FIG. 5 is a Scanning Electron Microscope (SEM) image of an untwisted carbon nanotube wire.

In other embodiments, the carbon nanotube structure may include a plurality of carbon nanotube wires. The carbon nanotube wires are located parallel to each other. The carbon nanotube wires can be in twisted form or in untwisted form. The untwisted carbon nanotube wires are formed by treating the carbon nanotube film with an organic solvent. Specifically, the entire surface of the carbon nanotube film is soaked in volatile organic solvent. After being soaked in the organic solvent, the adjacent parallel carbon nanotubes in the carbon nanotube film will be bundled together because of the surface tension of the organic solvent. This causes the carbon nanotube film to shrink into untwisted carbon nanotube wire when the organic solvent vaporizes. Referring to FIG. 5, an untwisted carbon nanotube wire includes a plurality of carbon nanotubes substantially oriented along the same direction (i.e., a direction along the length of the untwisted carbon nanotube wire). Specifically, the carbon nanotubes are substantially parallel to the axis of the untwisted carbon nanotube wire. Length of the untwisted carbon nanotube wire can be arbitrarily set as desired. A diameter of the untwisted carbon nanotube wire is in a range from about 0.5 nanometers to about 100 micrometers.

Figure 6:
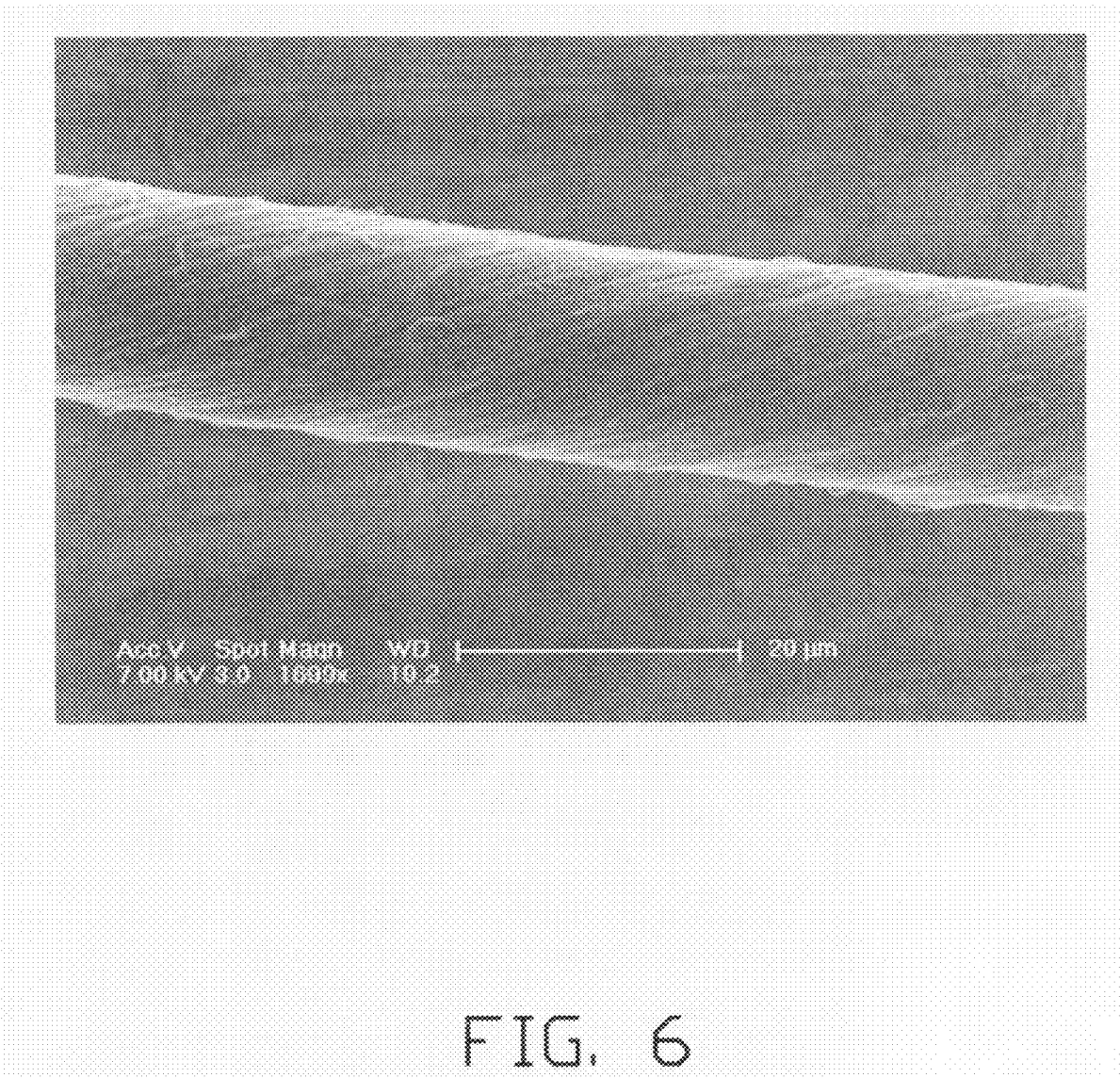
FIG. 6 is a Scanning Electron Microscope (SEM) image of a twisted carbon nanotube wire.

The twisted carbon nanotube wires are formed by twisting a carbon nanotube film. In the example embodiment, the twisted carbon nanotube wires are formed by using a mechanical force to turn the two ends of the carbon nanotube film in opposite directions. Referring to FIG. 6, a twisted carbon nanotube wire includes a plurality of carbon nanotubes oriented around an axial direction of the twisted carbon nanotube wire, resulting in a helix pattern.

Further, the twisted carbon nanotube wires can be treated with a volatile organic solvent. After being soaked in the organic solvent, the adjacent parallel carbon nanotubes in the twisted carbon nanotube wire will be bundled together, due to the surface tension of the organic solvent when the organic solvent vaporizes. As a result, the specific surface area of the twisted carbon nanotube wire is decreased. Consequentially, the density and the strength of the twisted carbon nanotube wire are increased.

Alternatively, in other embodiments the carbon nanotube structure of the heater 207a can include one or more carbon nanotube composite structures. The carbon nanotube composite structure can include a carbon nanotube assembly and a plurality of fillers dispersed therein. The filler can be comprised of a material selected from a group consisting of metal, ceramic, glass, carbon fiber, resin, polymer and combinations thereof.

Further, the liquid crystal display 200 may include a second heating element 227. The second heating element 227 is located on the fourth surface 222b of the second substrate 222. The material and the structure of the second heating element 227 can be the same as the first heating element 207.

Additionally, the liquid crystal display 200 may include at least one polarizer (not shown). The polarizer can be located on any surface of the first heating element 207 or the second heating element 227. The liquid crystal display 200 include two polarizers in the present embodiment.

The liquid crystal display 200 can further include a transparent protective layer (not shown). The transparent protective layer is configured to cover each of the heating elements 207, 227. The transparent protective layer prevents the heating elements 207, 227 from being exposed to the environment. The transparent protective layer can be made of a materials selected from a group consisting of diamonds, silicon nitrogen, hydride of random silicon, silicon carbon, silicon dioxide, aluminum oxide, tin oxide, cerium oxide, zinc titanate, indium titanate, benzocyclobutane, and acrylic resin.

Figure 7:
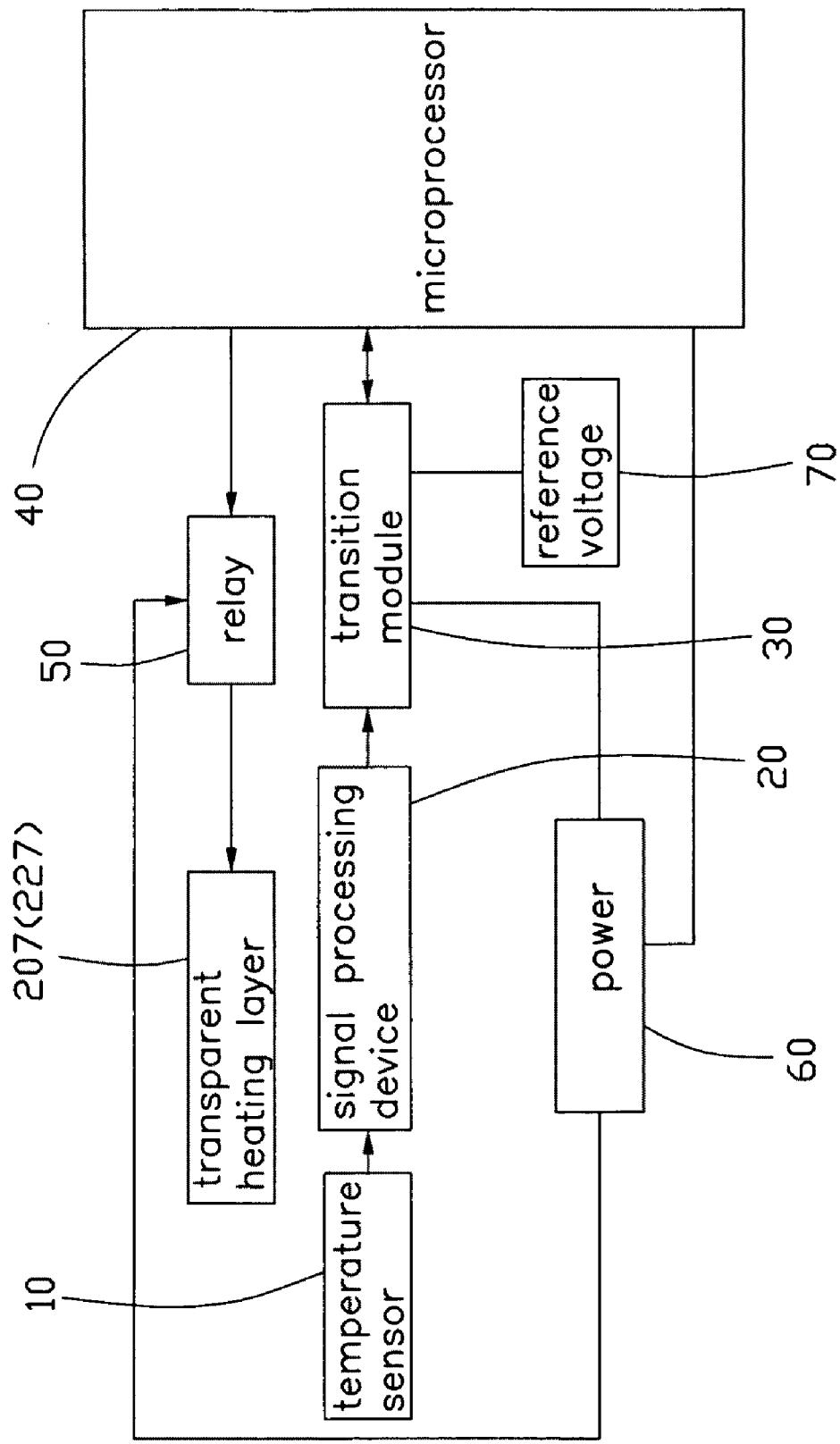
FIG. 7 is a circuit diagram of performing the liquid crystal display of FIG. 1.

The heating elements 207, 227 are controlled by a temperature controlling system. Referring to FIG. 7, the temperature controlling system includes a temperature sensor 10, a signal processing device 20, a transition module 30, a microprocessor 40, a relay 50, and a power source 60. The temperature sensor 10 can be located inside the liquid crystal display 200 and electrically connected to the signal processing device 20. The signal processing device 20 is electrically connected to the transition module 30. The transition module 30 is electrically connected to the microprocessor 40. The microprocessor 40 is electrically connected to the relay 50. The heating elements 207, 227 are electrically connected to the relay 50. The transition module 30, microprocessor 40, and relay 50 are electrically connected to the power source 60. The transition module 30 is supplied with a reference voltage 70. The microprocessor 40 is a single-chip microcomputer.

The process for heating elements 207, 227 heating the liquid crystal display 200 by the heating elements 207, 227 will be indicated as following.

The temperature sensor 10 collects the temperature signals and passes the temperature signals to the signal processing device 20. The temperature signals are amplified and filtered by the signal processing device 20, and then passed to the transition module 30. The transition module 30 converts the temperature signals to digital signals, and then outputs the digital signals to the microprocessor 40. The microprocessor 40 processes the digital signals and outputs pulse signals to the relay 50. Once the relay 50 closes and the heating elements 207, 227 are electrically connected to the power source 60, the heating elements 207, 227 begin to heat the liquid crystal display 200. The liquid crystal display 200 heated to a certain temperature at which the relay 50 opens, and then the heating elements 207, 227 power off and stop heating.

Alternatively, the temperature controlling system may further include a transformer (not shown) electrically connected to the transition module 30. The reference voltage 70 supplied to the transition module 30 can be varied by adjusting the transformer. Thus, the output temperature of the heating elements 207, 227 can be varied through vary the reference voltage 70 supplied to the transition module 30.

Due to the carbon nanotube having excellent conductive properties, thermal stability, high thermal radiation efficiency, and large specific surface area, the carbon nanotube structure of the present embodiment can serve as a perfect black body. The thermal response speed of the carbon nanotube structure is high due to its small heat capacity of per unit area which less than $1.7 \times 10^{-6}$ $J/(CM^2 \cdot K)$. A carbon nanotube film with a thickness of about 1 micrometer to about 1 millimeter can reach its highest surface temperature within 1 second. A drawing carbon nanotube film can reach its highest surface temperature within 0.1 milliseconds.

Figure 8:
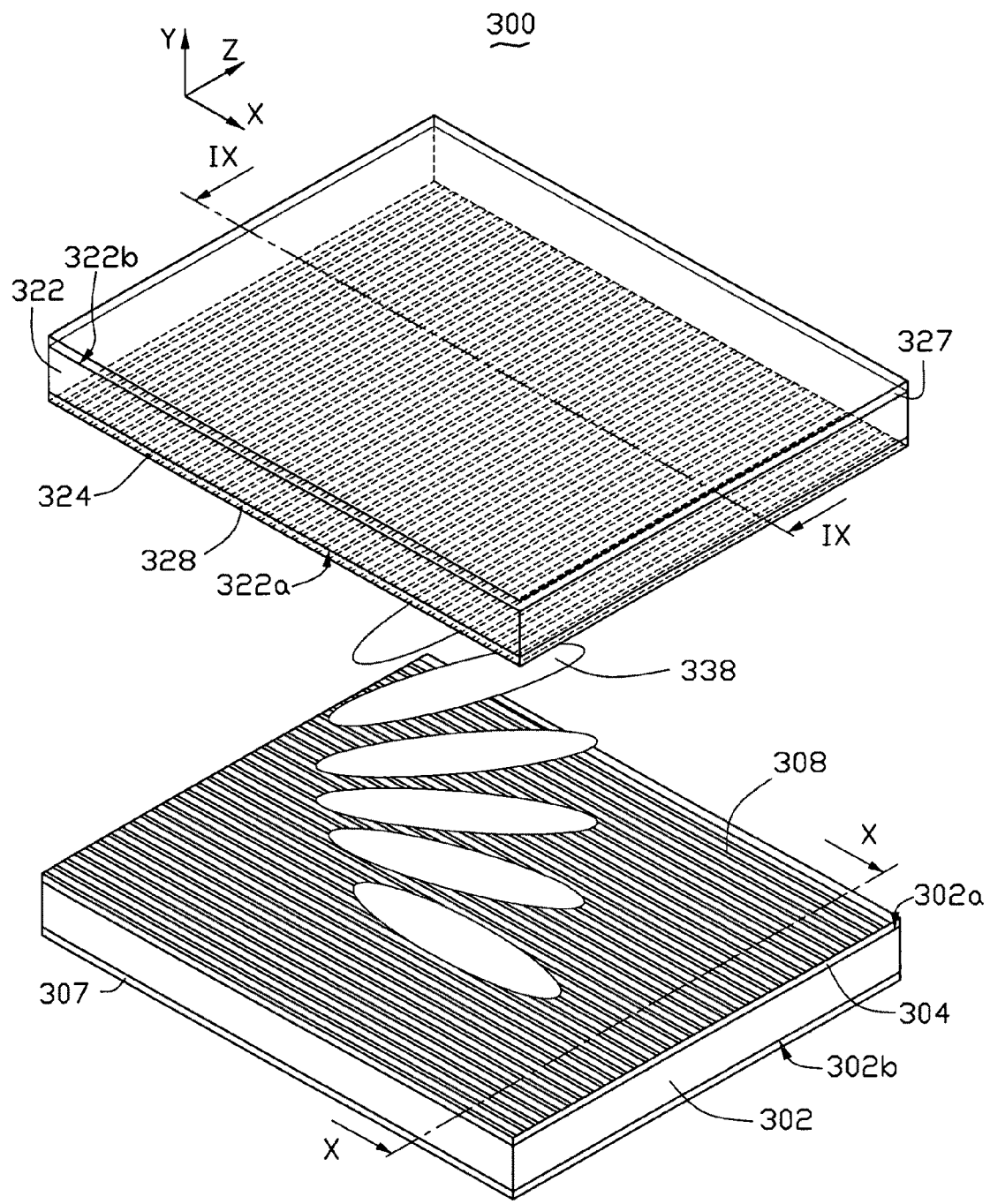
FIG. 8 is a schematic, isometric view of a liquid crystal display in accordance with a second embodiment of the present disclosure.
Figure 9:
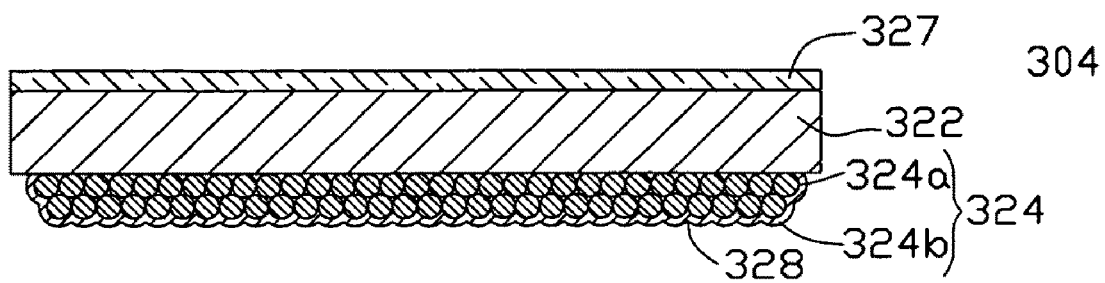
FIG. 9 is a cross-sectional schematic view of the liquid crystal display of FIG. 8 taken along a line IX-IX.
Figure 10:
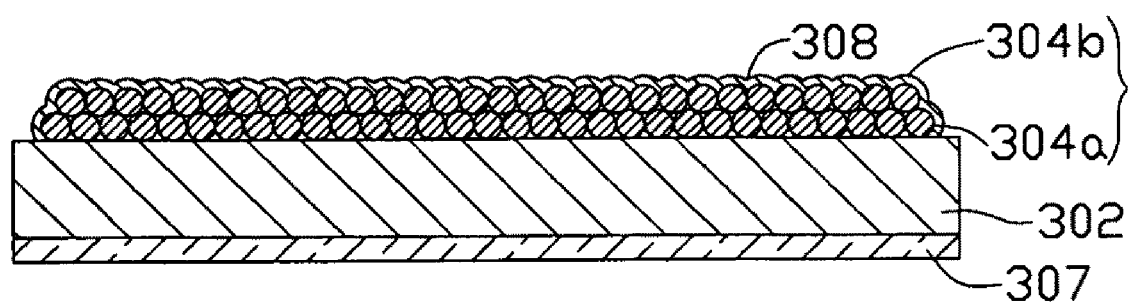
FIG. 10 is a cross-sectional schematic view of the liquid crystal display of FIG. 8 taken along a line X-X.

Referring to FIGS. 8, 9 and 10, a liquid crystal display 300 according to a second embodiment includes a first heating element 307, a first substrate 302, a first alignment layer 304, a liquid crystal layer 338, a second alignment layer 324, and a second substrate 322. The liquid crystal layer 338 is sandwiched between the first substrate 302 and the second substrate 322. The first substrate 302 has a first surface 302a and a second surface 302b. The second substrate 322 has a third surface 322a and a fourth surface 322b. The first alignment layer 304 is located on the first surface 302a of the first substrate 302. The first alignment layer 304 includes a plurality of parallel first grooves 308 facing the liquid crystal layer 338. The second alignment layer 324 is located on the third surface 322a of the second substrate 322. The second alignment layer 324 includes a plurality of parallel second grooves 328 facing the liquid crystal layer 338. The alignment direction of the first grooves 308 is perpendicular to the alignment direction of the second grooves 328. The first heating element 307 is located on the second surface 302b of the first substrate 302.

Further, the liquid crystal display 300 includes a second heating element 327. The second heating element 327 is located on the fourth surface 322b of the second substrate 322. The material and the structure of the heating elements 307, 327 are the same as the heating elements 207, 227. Therefore, the detailed description of the heating elements 307, 327 is omitted for brevity.

The liquid crystal display 300 in the second embodiment has a structure similar to the liquid crystal display 200 in the first embodiment. The difference between the liquid crystal display 300 and the liquid crystal display 200 is that at least one the first alignment layer 304 and the second alignment layer 324 includes a carbon nanotube structure. The carbon nanotube structure has excellent conductivity and includes a plurality of gaps therein. The gaps can be used as grooves to arrange and orient the liquid crystal molecules of the liquid crystal layer 338 in a particular direction The carbon nanotube structure can be the same as the carbon nanotube structure used in the first embodiment. It is to be understood that while the carbon nanotube structures include at least two stacked carbon nanotube films, the aligned direction of the carbon nanotubes in any two adjacent carbon nanotube films oriented along the same direction.

Further the liquid crystal display 300 includes at least one fixing layer on the surface of the carbon nanotube structure. In the present embodiment, the first alignment layer 304 includes a first carbon nanotube structure 304a and a first fixing layer 304b; and the second alignment layer 324 includes a second carbon nanotube structure 324a and a second fixing layer 324b. Due to the first carbon nanotube structure 304a having a plurality of parallel and uniform gaps, when the first fixing layer 304b is correspondingly formed on the first carbon nanotube structure 304a, the first grooves 308 are formed on surfaces of the first fixing layer 304b. Due to the second carbon nanotube structure 324a having a plurality of parallel and uniform gaps, when the second fixing layer 324b is correspondingly formed on the second carbon nanotube structure 324a, the second grooves 328 are formed on surfaces of the second fixing layer 324b.

In order to fabricate the first grooves 308 to be perpendicular to the second grooves 328, the carbon nanotubes in the first alignment layer 304 are arranged perpendicular to the carbon nanotubes arranged direction in the second alignment layer 324. For example, the carbon nanotubes in the first alignment layer 304 are each aligned parallel to the X-axis, and the carbon nanotubes in the second alignment layer 324 are each aligned parallel to the Z-axis. A thickness of each of the first alignment layer 304 and the second alignment layer 324 can be in a range from about 1 micrometer to about 50 micrometers.

The fixing layers 304b, 324b can be made of materials selected from the group consisting of diamonds, silicon nitrogen, hydride of random silicon, silicon carbon, silicon dioxide, aluminum oxide, tin oxide, cerium oxide, zinc titanate, and indium titanate. The fixing layers 304b, 324b can be fabricated by means of evaporating, sputtering, or plasma enhanced chemical vapor deposition. Alternatively, the fixing layers 304b, 324b can be made of materials selected from the group consisting of polyethylene ethanol, polyamide, polymethyl methacrylate, and polycarbonate. The fixing layers 304b, 324b are sprayed on the first carbon nanotube structure 304a and the second carbon nanotube structure 324a. A thickness of the fixing layers is in a range from about 20 nanometers to about 2 micrometers.

Because the carbon nanotubes in each carbon nanotube structure are arranged in parallel, the carbon nanotube structure has a light polarization characteristic, and thus, can be used to replace a conventional polarizer. However, at least one polarizer can be disposed on a surface of the first heating element 307 that faces away from the liquid crystal layer 338, and/or on a surface of the second heating element 327 that faces away from the liquid crystal layer 338. The polarizer can be disposed between the first heating element 307 and the first substrate 302, or between the second heating element 327 and the second substrate 322.

The liquid crystal display provided in the present embodiment is a single-pixel liquid crystal display. By arranging a number of the liquid crystal displays in a predetermined fashion, a multi-pixel liquid crystal display could be obtained. The multi-pixel liquid crystal display could have the same or different substrate.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A liquid crystal display comprising:
   at least one heating element located on at least one of a first substrate and a second substrate comprising at least one carbon nanotube structure.

2. The liquid crystal display of claim 1, wherein the heating element comprises a plurality of carbon nanotube structures electrically connected in series.

3. The liquid crystal display of claim 1, wherein the heating element comprises a plurality of carbon nanotube structures electrically connected in parallel.

4. The liquid crystal display of claim 1, wherein the carbon nanotube structure comprises a plurality of carbon nanotubes.

5. The liquid crystal display of claim 1, wherein the carbon nanotube structure comprises a plurality of ordered carbon nanotubes.

6. The liquid crystal display of claim 1, wherein the carbon nanotube structure comprises at least one carbon nanotube film comprising a plurality of carbon nanotubes primarily oriented along the same direction.

7. The liquid crystal display of claim 6, wherein the carbon nanotube film comprises a plurality of successively oriented carbon nanotube segments joined end-to-end by van der Waals attractive force therebetween.

8. The liquid crystal display of claim 7, wherein each carbon nanotube segment comprises of a plurality of carbon nanotubes having substantial the same length and being parallel to each other, and adjacent carbon nanotubes are attracted by van der Waals attractive force therebetween.

9. The liquid crystal display of claim 1, wherein the carbon nanotube structure comprises a plurality of stacked carbon nanotube films, and adjacent carbon nanotube films are attracted by van der Waals attractive force therebetween.

10. The liquid crystal display of claim 1, wherein the carbon nanotube structure comprises a plurality of carbon nanotube wires.

11. The liquid crystal display of claim 10, wherein each carbon nanotube wire comprises a plurality of carbon nanotubes joined end-to-end by van der Waals attractive force.

12. The liquid crystal display of claim 10, wherein the carbon nanotube wire is twisted.

13. The liquid crystal display of claim 1, wherein the heating element has a square-wave or a saw-tooth wave shape.

14. The liquid crystal display of claim 1, further comprising a transparent protective layer located over the heating element.

15. The liquid crystal display of claim 14, wherein the transparent protective layer comprises of a material selected from a group consisting of diamonds, silicon nitrogen, hydride of random silicon, silicon carbon, silicon dioxide, aluminum oxide, tin oxide, cerium oxide, zinc titanate, indium titanate, benzo cyclo butane and acrylic resin.

16. The liquid crystal display of claim 1, further comprising a polarizer located over the heating element.

17. The liquid crystal display of claim 1, further comprising a first alignment layer and a second alignment layer, wherein at least one of the first and the second alignment layers comprises of the carbon nanotube structure.

18. The liquid crystal display of claim 17, wherein the carbon nanotube structure comprises a plurality of carbon nanotubes arranged along the same direction.

19. The liquid crystal display of claim 17, further comprising a fixing layer located on the carbon nanotube structure.

20. The liquid crystal display of claim 1, wherein the at least one carbon nanotube structure comprises at least one carbon nanotube composite structure.

* * * * *